(No Model.)

J. ETZENSPERGER.
BRACELET.

No. 248,641. Patented Oct. 25, 1881.

WITNESSES:
J. A. Miller Jr
Wm. L. Corp.

INVENTOR:
John Etzensperger
by Joseph A. Miller
Atty

UNITED STATES PATENT OFFICE.

JOHN ETZENSPERGER, OF NORTH ATTLEBOROUGH, MASSACHUSETTS.

BRACELET.

SPECIFICATION forming part of Letters Patent No. 248,641, dated October 25, 1881.

Application filed June 13, 1881. (No model.)

*To all whom it may concern:*

Be it known that I, JOHN ETZENSPERGER, of North Attleborough, in the county of Bristol and State of Massachusetts, have invented a new and useful Improvement in Bracelets; and I hereby declare that the following is a full, clear, and exact description of the same, reference being had to the accompanying drawings, forming part of this specification.

This invention has reference to an improvement in hinged bracelets; and it consists in uniting the two wings of a bracelet together by means of a ball-and-socket or other universal-jointed hinge, as will be more fully set forth hereinafter.

Bracelets are usually made in two parts, which are hinged together at one end and secured by means of a snap at the other end. Such bracelets are rigidly secured, and are liable to break at the hinge, which, in fact, is the weakest part of the bracelet. The hinge is also the most costly part of the bracelet, as far as workmanship is concerned. To make the hinge much more flexible than has been done heretofore, to make it stronger, simpler, and cheaper, is the object of this invention.

Figure 1:
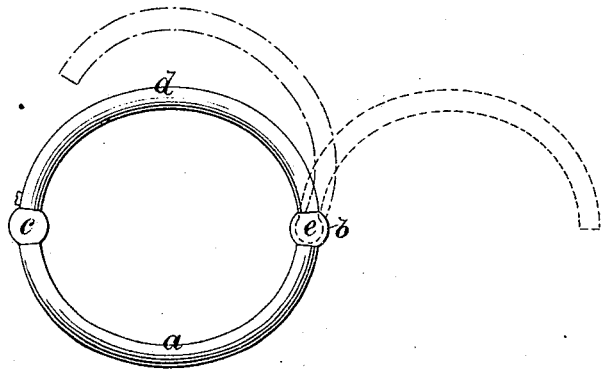
Figure 2:
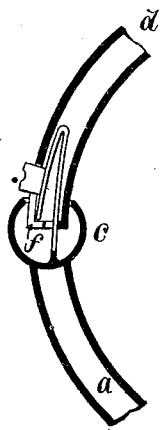
Figure 3:
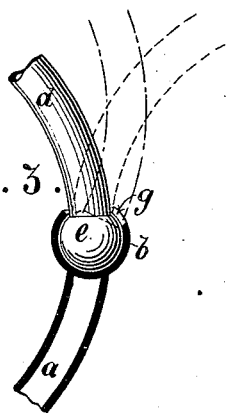
Figure 4:
Figure 5:

Figure 1 is a view of my improved bracelet, showing one of the wings, in broken lines, as open, and also as swung on one side. Fig. 2 is a sectional view showing the latched ends. Fig. 3 is an enlarged sectional view, showing the ball-and-socket joint, and also showing a small segmental portion cut out from the socket so as to allow the wings to open farther. Fig. 4 is a sectional view of the latch, and Fig. 5 a view of the end of the wing into which the latch enters.

In the drawings, *a* is one wing of a bracelet, provided with the spherical socket *b* at one end and the latch *c* on the other end. *d* is the other wing of the bracelet, provided with the ball *e* at one end and the slot *f* to receive the latch. The ball *e* may be formed on the end of the wing by first enlarging the end sufficiently to form the ball and then upsetting the metal in dies, or the ball may be secured to the end of the wing. The socket may be formed and secured to the wing, or it may be made by enlarging the end of the wing, (which is usually made of tubular wire,) and, after inserting the ball, compressing the outer edge in a die so as to close over and retain the ball. The wing *d* is allowed to turn freely in the socket *b*, and to give it more play in opening a segmental portion, *g*, is cut out of the socket *b*, as is shown in Figs. 1 and 3.

The construction of this bracelet is much more simple, and is cheaper, than any form of hinged bracelet heretofore made. The bracelet is much stronger, more convenient in use, and presents a more finished appearance than hinged bracelets as heretofore made, particularly when made of tubular wire.

Having thus described my invention, I claim as new and desire to secure by Letters Patent—

1. As a new article of manufacture, a bracelet the two wings of which are hinged together by a ball-and-socket universal joint, as described.

2. The combination, with the wings *a* and *d*, of the ball *e* and socket *b*, and the latch *c*, constructed to form a bracelet, as described.

In witness whereof I have hereunto set my hand.

JOHN ETZENSPERGER.

Witnesses:
J. A. MILLER, Jr.,
WM. L. COOP.